United States Patent [19]

Fink et al.

[11] 4,200,529

[45] Apr. 29, 1980

[54] METHOD OF DEWATERING A SLURRY

[75] Inventors: Eugen Fink; Eberhard Krennwallner, both of Munich, Fed. Rep. of Germany

[73] Assignee: Krauss-Maffei AG, Munich, Fed. Rep. of Germany

[21] Appl. No.: 931,015

[22] Filed: Aug. 4, 1978

[51] Int. Cl.[2] .............................................. B01D 33/10

[52] U.S. Cl. .................................... 210/73 R; 210/78; 210/375

[58] Field of Search ........................ 209/5, 12, 10, 211; 210/73 R, 73 S, 78, 84, 294, 320, 360 R, 512 R, 369, 372, 374, 375

[56] References Cited

U.S. PATENT DOCUMENTS 3,215,509 11/1965 Adams .................................. 209/12

3,572,500 3/1971 Kouloheris ............................ 209/10

*Primary Examiner*—Frank Sever

*Attorney, Agent, or Firm*—Karl F. Ross

[57] ABSTRACT

A slurry, such as of sulfide-type copper ore, is separated into a coarse suspension and a fine suspension. The coarse suspension is centrifuged to separate the solid and liquid phases thereof. The fine suspension may be centrifuged or filtered separately from the coarse suspension similarly to separate its solid and liquid phases. The solid phases of both of these separation operations are then mixed together and can be used for further smelting. It is also possible according to this invention to use a drum centrifuge both for the initial separation into fine and coarse suspensions and for the dewatering for the coarse suspension.

10 Claims, 2 Drawing Figures

METHOD OF DEWATERING A SLURRY

FIELD OF INVENTION

The present invention relates to a method of and apparatus for treating a suspension. More particularly this invention concerns a method and apparatus for dewatering an ore slurry.

BACKGROUND OF THE INVENTION

In the production of copper the normally low-grade sulfide ores are usually concentrated by flotation, the thus-produced slurry is dewatered, and the resultant substantially dry ore is smelted. After some thickening the slurry is normally passed through a vacuum filter to thicken it to a water content by weight of approximately 15%. Subsequent roasting of this still wet ore reduces its water content to a standard level of approximately 8.5%, at which level it is possible to smelt the ore.

The above-described two-stage dewatering is relatively expensive, mainly due to the use of the thermal drying step. Considerable energy is lost in the form of hot water vapor which is produced by roasting the relatively wet slurry, and no recovery method for this thermal energy is practical.

OBJECTS OF THE INVENTION

It is therefore an object of the present invention to provide an improved method of and apparatus for treating a suspension.

Another object is the provision of such a method and apparatus which are particularly applicable to the dewatering of copper ore.

SUMMARY OF THE INVENTION

These objects are attained according to the instant invention by first separating the thickened slurry or primary suspension into a fine suspension having a relatively fine solid phase and a coarse suspension having a relatively coarse solid phase, then separately separating the fine and the coarse suspensions into the respective solid and liquid phases. Thus according to the instant invention no thermal treatment step at all is required, instead the dewatering takes place entirely mechanically, by centrifuging at least the coarse suspension.

A very large energy saving is possible with this system according to the instant invention. It is a relatively simple process to separate the primary suspension into the coarse and fine suspensions. Similarly reducing the water content in the coarse suspension to a very low level, often much below that required for subsequent smelting, is also a relatively easy and economical operation. If the solid phases of the fine and coarse suspensions are subsequently added to each other it is therefore possible to only reduce the water content of the fine suspension to a level near that desired, and to achieve the desired end water content by addition of the relatively dry solid phase from the coarser suspension. This is particularly true since in most operations the coarse suspension will be at least 10 and normally 20 times as large as the fine suspension. The absence of fine particles in the coarse suspension makes dewatering of it a very easy task.

According to a feature of this invention the initial separation of the primary suspension is carried out by a liquid cyclone having an output for the coarse suspension and an output for the fine suspension. The coarse-suspension output may be connected via a storage tank to the input of a drum centrifuge such as described in commonly owned U.S. Pat. Nos. 3,943,056 and 4,052,303. The output for the fine suspension may be connected through a storage vessel or thickener to a filter or to another such drum centrifuge. The fine suspension here normally refers to a solid-particle mesh size of at most 10 microns.

It is possible in accordance with another feature of this invention to use a single drum centrifuge both for the separation of the primary suspension into the fine and coarse suspensions and for the dewatering of the coarse suspension. This is best done by loading the drum centrifuge so that the fine suspension, which will be radially inward of the solid phase of the coarse suspension, will overflow to a separate output by which it can leave the drum centrifuge along with the filtrate or liquid phase from the coarse suspension. Thereafter this fine suspension is dewatered by filtering or centrifuging as described above.

In fact it has been discovered that even the finest suspension can be dewatered much more effectively, once separated from the coarse suspension, than can the combined suspensions. In fact it lies within the scope of this invention to add a liquid, normally water, to the coarse suspension in the drum centrifuge to separate from it all of the fine particles having a mesh size under 10 microns, so that extremely efficient dewatering is possible at this drum centrifuge.

SPECIFIC DESCRIPTION

Figure 1:
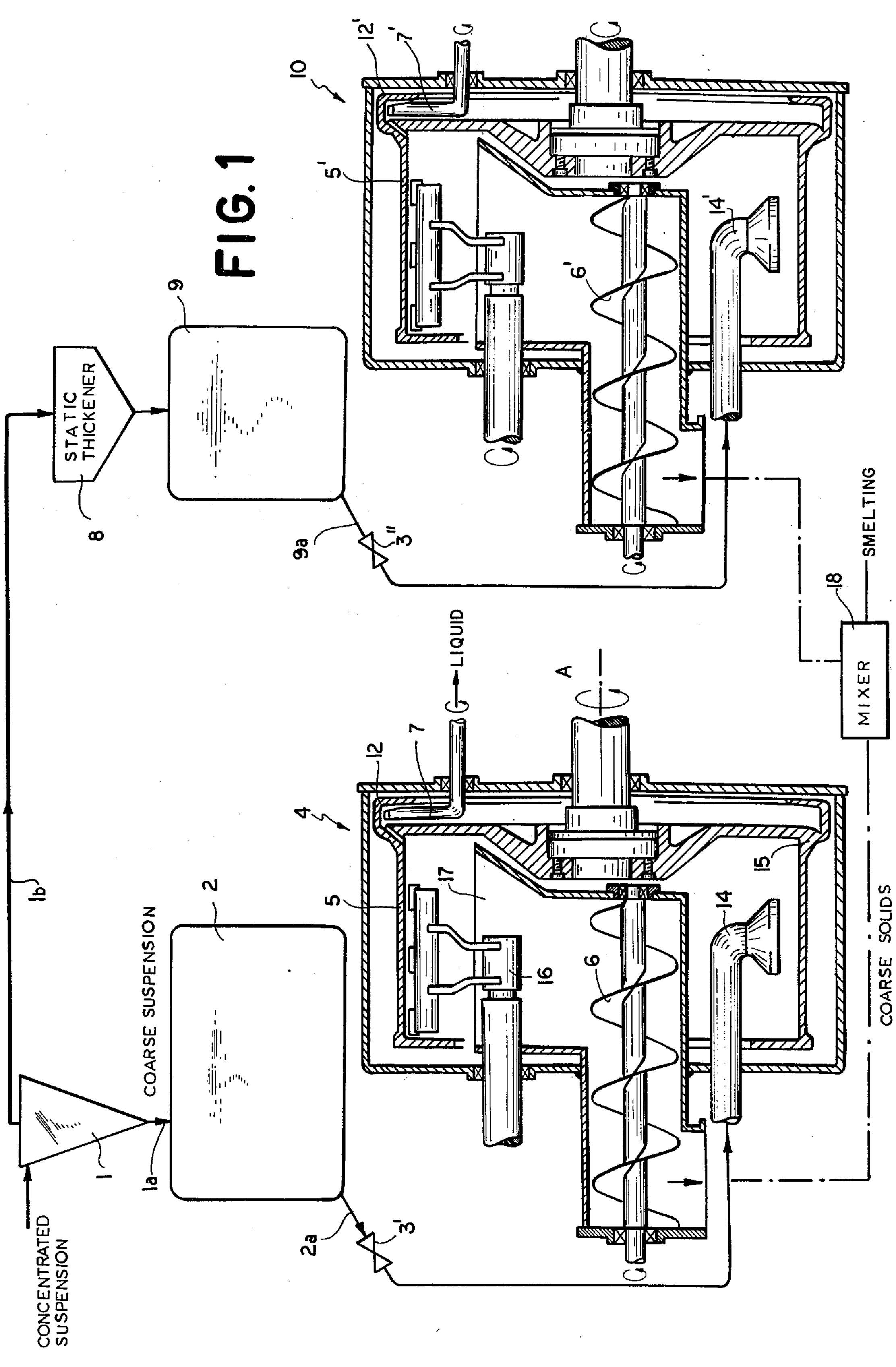
FIG. 1 is a partially diagramatic view of a system according to the instant invention.

According to the instant invention as shown in FIG. 1 a concentrated and thickened suspension of copper ore is fed to the input of a liquid cyclone 1 having a lower coarse-suspension output 1*a* and an upper fine-suspension output 1*b*. The coarse suspension, having a particle size above 10 microns, is fed into a storage container 2 whence it can be led off via a lower output 2*a* and through a valve 3' to the input 14 of a drum-type centrifuge 4 substantially as described in the above-cited commonly owned patents.

This centrifuge 4 has a drum 5 rotatable at high speed about an axis A and formed with throughgoing syphon holes 15 leading into a syphon channel 12 in which an adjustable dip tube 7 is displaceable. High-speed rotation of the drum 5 centrifugally drives the liquid in the suspension through the holes 15 and into the channel 12 whence it can be drawn off by the dip tube 7. Once the coarse suspension is sufficiently dewatered a scraping arrangement 16 can scrape it off into a hopper 17 provided with an output auger 6. The coarse solids from the drum centrifuge 4 have a moisture content of approximately 6% by weight.

The fine suspension is fed via the output 1*b* of the cyclone 1 to a static thickener 8 and thence into a storage vessel 9 again having a lower output 9*a* connectable through a valve 3" to the input 14' of a drum centrifuge 10 identical to the drum centrifuge 4 and having a drum 5', a dip tube 7', a channel 12', and an output auger 6'. Herein the relatively fine solid particles having a mesh size of less than 10 microns are separated from the liquid phase of the fine suspension to give the solid phase carried out by the auger 6′ a moisture content of at most 10%.

The solid phases from both of the fine and coarse suspensions are mixed at 18 so that the mixture has a moisture content of at most 8.5% by weight. In fact since the separation in the cyclone 1 normally creates a fine suspension which is only equal to approximately one-twentieth of the coarse suspension, the moisture content of the mixed solid phases can be even lower. It is also possible to provide the drums 5 and 5′ with filter-cloth linings such as shown in the above-mentioned U.S. Pat. No. 4,052,303, in which case the moisture content will be between 1% and 3% higher.

After mixing the solid phases are ideally suited for further smelting. Their moisture content is sufficiently low to allow them to be treated without further dewatering.

Figure 2:
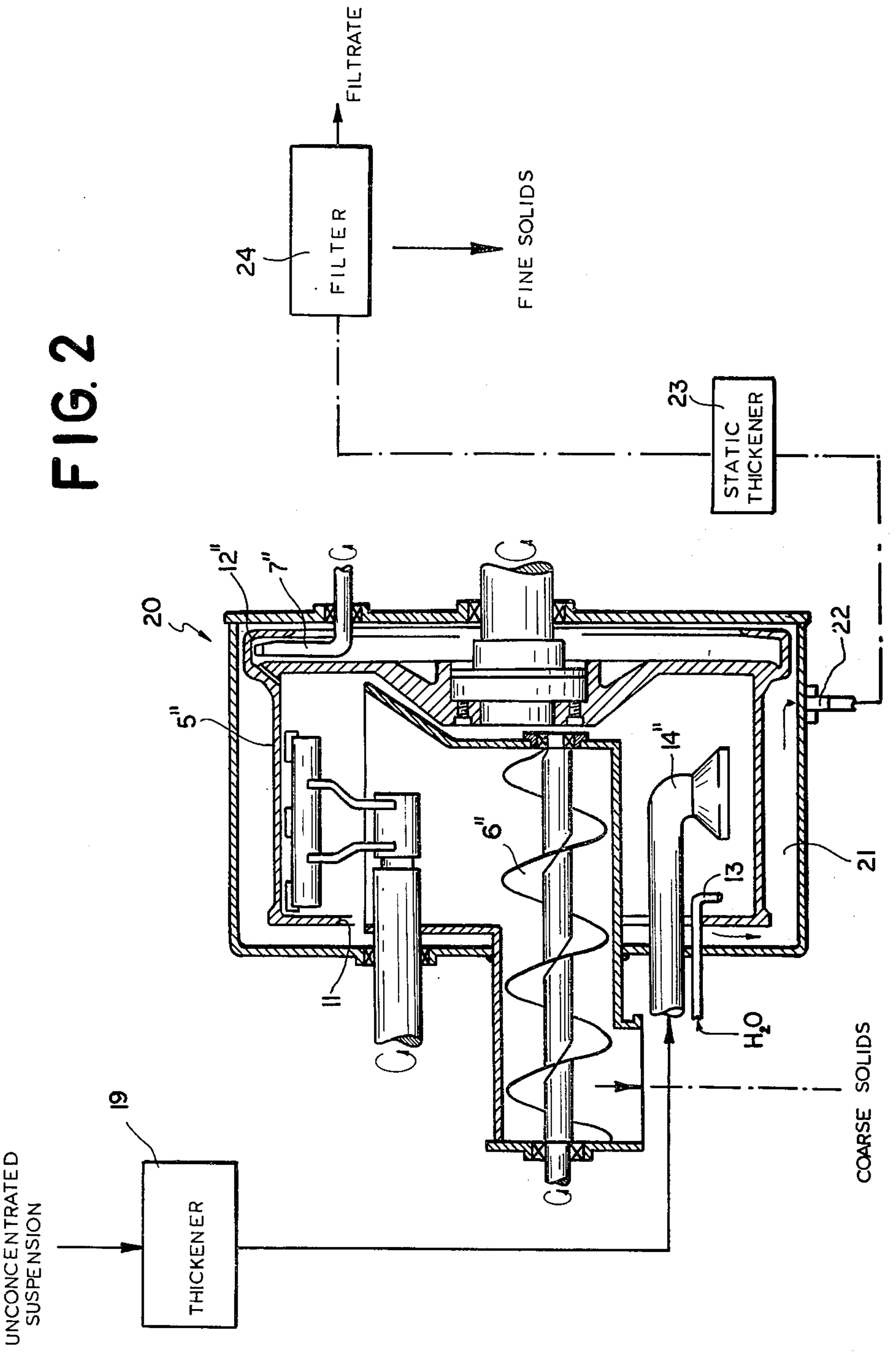
FIG. 2 is another diagramatic view illustrating another system according to this invention.

FIG. 2 shows another arrangement wherein an unconcentrated and unthickened suspension is fed into a thickener 19 and thence into the input 14″ of a drum centrifuge 20 similar to the centrifuges 4 and 10, that is having a drum 5″, overflow channel 12″, dip tube 7″, and output auger 6″. In addition this drum centrifuge has an overflow edge 11 and a secondary fill input 13. This centrifuge 20 is therefore used both for the original separation of the primary suspension into the fine and coarse suspensions, and for the dewatering of the coarse suspension.

Thus in use the primary suspension, which may in accordance with this invention even be fed in without thickening, is fed to the inner wall of the drum 5″ which is rotated at high speed. At the same time excess water is added via the tube 13 whose output lies radially inside the output and of the feed 14″, so that the fine suspension as well as some of the filtrate flows over the edge 11 and into the space 21 whence it can leave the drum centrifuge 20 by means of an outlet opening 22. Thereafter the fine suspension is passed through a static thickener 23 and through a filter 24 which may be of the vacuum or pressure type and which produces the filtrate, that is the liquid phase, and the fine-solid phase.

With the arrangement described above referring to FIG. 2 it is still possible to produce solids having a moisture content of at most 8.5%. In fact it is possible to achieve substantially lower moisture levels in accordance with this invention once the fine solids and coarse solids are recombined.

We claim:

1. A method of dewatering a copper-ore slurry, said method comprising the steps of:

separating said slurry into a fine suspension having a relatively fine solid phase having a mesh size of at most 10 microns and a coarse suspension having a relatively coarse solid phase having a mesh size greater than 10 microns;

centrifuging said coarse suspension to separate the solid and liquid phases thereof solely by mechanical means; and separately separating said fine suspension into the solid and liquid phases thereof solely by mechanical means.

2. The method defined in claim 1, further comprising the step of thickening said slurry prior to separation thereof into said fine and coarse suspension.

3. The method defined in claim 2 wherein said slurry is thickened to a liquid content by weight of 15%.

4. The method defined in claim 1 wherein said fine suspension is separated by centrifuging also.

5. The method defined in claim 1 wherein said fine suspension is separated by filtering.

6. The method defined in claim 1 wherein said coarse suspension is at least ten times larger than said fine suspension.

7. The method defined in claim 6 wherein said coarse suspension is generally twenty times larger than said fine suspension.

8. The method defined in claim 1, further comprising the step of mixing said solid phases of said fine and coarse suspensions after separation thereof from the respective liquid phases.

9. The method defined in claim 1, further comprising the step of statically thickening said fine suspension prior to separation thereof into its phases.

10. The method defined in claim 1 wherein said slurry is separated into said fine and coarse suspensions by centrifuging simultaneously as said coarse suspension is separated into its phases.

* * * * *